(12) United States Patent
Younis

(10) Patent No.: US 11,893,870 B2
(45) Date of Patent: Feb. 6, 2024

(54) MACHINE COORDINATION AND MANAGEMENT OF UNITING A MINOR WITH A GUARDIAN

(71) Applicant: SCHOOLTRON INC., Dearborn, MI (US)

(72) Inventor: Waseem Younis, Dearborn, MI (US)

(73) Assignee: SCHOOLTRON INC., Dearborn, MI (US)

( * ) Notice: Subject to any disclaimer, the term of this patent is extended or adjusted under 35 U.S.C. 154(b) by 0 days.

(21) Appl. No.: 17/380,438

(22) Filed: Jul. 20, 2021

(65) Prior Publication Data

US 2023/0022006 A1 Jan. 26, 2023

(51) Int. Cl.
*G01C 21/34* (2006.01)
*G08B 21/02* (2006.01)

(52) U.S. Cl.
CPC ..... *G08B 21/0269* (2013.01); *G08B 21/0275* (2013.01); *G08B 21/0283* (2013.01)

(58) Field of Classification Search
None
See application file for complete search history.

(56) References Cited

U.S. PATENT DOCUMENTS

| | | | |
|---|---|---|---|
| 8,165,773 B1* | 4/2012 | Chavez | G01C 21/26 701/423 |
| 10,943,420 B1* | 3/2021 | Heller | E05B 65/0035 |
| 11,252,327 B1* | 2/2022 | Chaganti | G11B 27/031 |
| 2010/0106404 A1* | 4/2010 | Kim | G06Q 10/109 701/465 |
| 2014/0368601 A1* | 12/2014 | deCharms | H04N 7/148 348/14.02 |
| 2015/0106897 A1* | 4/2015 | Davis | H04L 63/083 726/7 |
| 2019/0318159 A1* | 10/2019 | Blanc-Paques | G06Q 50/30 |

* cited by examiner

*Primary Examiner* — John F Mortell
(74) *Attorney, Agent, or Firm* — Columbia IP Law

(57) ABSTRACT

Technologies and implementations for machine coordination and management of pickup of a minor with a guardian. The machine coordination and management may be facilitated by a child pickup module (CPM).

14 Claims, 6 Drawing Sheets

500 A computer program product

502 A signal bearing medium 504 at least one of machine readable non-transitory medium having stored therein instructions that, when executed by a processor, operatively enable a child pickup module (CPM) to:
    receive an indication from a registered device that the registered device is about to be en route to a predetermined location, the predetermined location having a subject,
    transmit a request for confirmation of a user of the registered device,
    determine if the requested confirmation of the user of the registered device is received,
    determine a location of the registered device,
    detect motion of the registered device,
    determine an estimated time of arrival at the predetermined location based, at least in part, on the detected motion of the registered device,
    receive an indication of close proximity of the registered device to the predetermined location, and
    responsive to the received indication of close proximity, coordinate colocation of the registered device and the subject at the predetermined location.

| 506 a computer-readable medium | 508 a recordable medium | 510 a communications medium |

Figure 5

MACHINE COORDINATION AND MANAGEMENT OF UNITING A MINOR WITH A GUARDIAN

INFORMATION

Unless otherwise indicated herein, the approaches described in this section are not prior art to the claims in this application and are not admitted to be prior art by inclusion in this section.

A common activity by a guardian of a minor (e.g., parent of a child) may be to accompany the minor to and/or from an institution. For example, the parent may drop off the child at a school, and at the end of the school day, the parent may pick up the child from the school. Picking up the child at the end of the day may sound simple but, as most people who have had to pick up a child from a school may appreciate, the process may be a stressful and complicated ordeal.

For example, a school (e.g., kindergarten) attended by a child (e.g., 5 year old child) may end at 3:00 p.m. in the afternoon. A parent or guardian may be required to pick the child up after school. Using a vehicle, the parent may depart from their current location to pick up the child leaving sufficient time for travel to the school. The sufficient time may be calculated from a variety of sources such as, a mapping application. However, just getting to the school on time may be challenging due to varying road conditions (e.g., accidents, traffic, road work, etc.) that may not have been detected and considered by the mapping application. Even after arriving close to the school, picking up the child may be challenging due the many variables at the school (e.g., the number of other parents/guardians waiting in line to pick their child). Additionally, the location of where to meet the child may have changed, who may be authorized to pick up the child may have changed (e.g., a parent delayed at work requests a different adult to pick up the child), and so forth.

Some additional challenges may include, but not limited to, ensuring by the school that the child was properly picked up by an authorized person, coordinating by the child and/or the school the exact location of where to pick up the child (e.g., the child may have had to use the restroom), alterations in the actual child pick up (e.g., the child may decide to go home with a friend, a friend of the child may decide to go home with the child being picked up, etc.). Accordingly, there may be numerous challenges of simply picking up a child from school.

All subject matter discussed in this section of this document is not necessarily prior art and may not be presumed to be prior art simply because it is presented in this section. Plus, any reference to any prior art in this description is not and should not be taken as an acknowledgement or any form of suggestion that such prior art forms parts of the common general knowledge in any art in any country. Along these lines, any recognition of problems in the prior art are discussed in this section or associated with such subject matter should not be treated as prior art, unless expressly stated to be prior art. Rather, the discussion of any subject matter in this section should be treated as part of the approach taken towards the particular problem by the inventor(s). This approach in and of itself may also be inventive. Accordingly, the foregoing summary is illustrative only and not intended to be in any way limiting. In addition to the illustrative aspects, embodiments, and features described above, further aspects, embodiments, and features will become apparent by reference to the drawings and the following detailed description.

SUMMARY

Described herein are various illustrative machine coordination and management of uniting a minor with a guardian. Some examples may include receiving, at a computing device, an indication from a registered device that the registered device is about to be en route to a predetermined location, where the predetermined location having a subject. Some examples may include transmitting, by the computing device, a request for confirmation of a user of the registered device. The machine coordination and management may include determining, by the computing device, if the requested confirmation of the user of the registered device is received, and if it is determined, by the computing device, that the requested confirmation of the user of the registered device is received, determining a location of the registered device. Other examples may include detecting, by the computing device, motion of the registered device. Some other examples of machine coordination and management may include determining, by the computing device, an estimated time of arrival at the predetermined location based, at least in part, on the detected motion of the registered device. Additionally, coordination and management may include receiving, by the computing device, an indication of close proximity of the registered device to the predetermined location, and coordinating, by the computing device, colocation of the registered device and the subject at the predetermined location.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 illustrates an example computer program product, arranged in accordance with at least some embodiments described herein.

DETAILED DESCRIPTION

Figure 1:
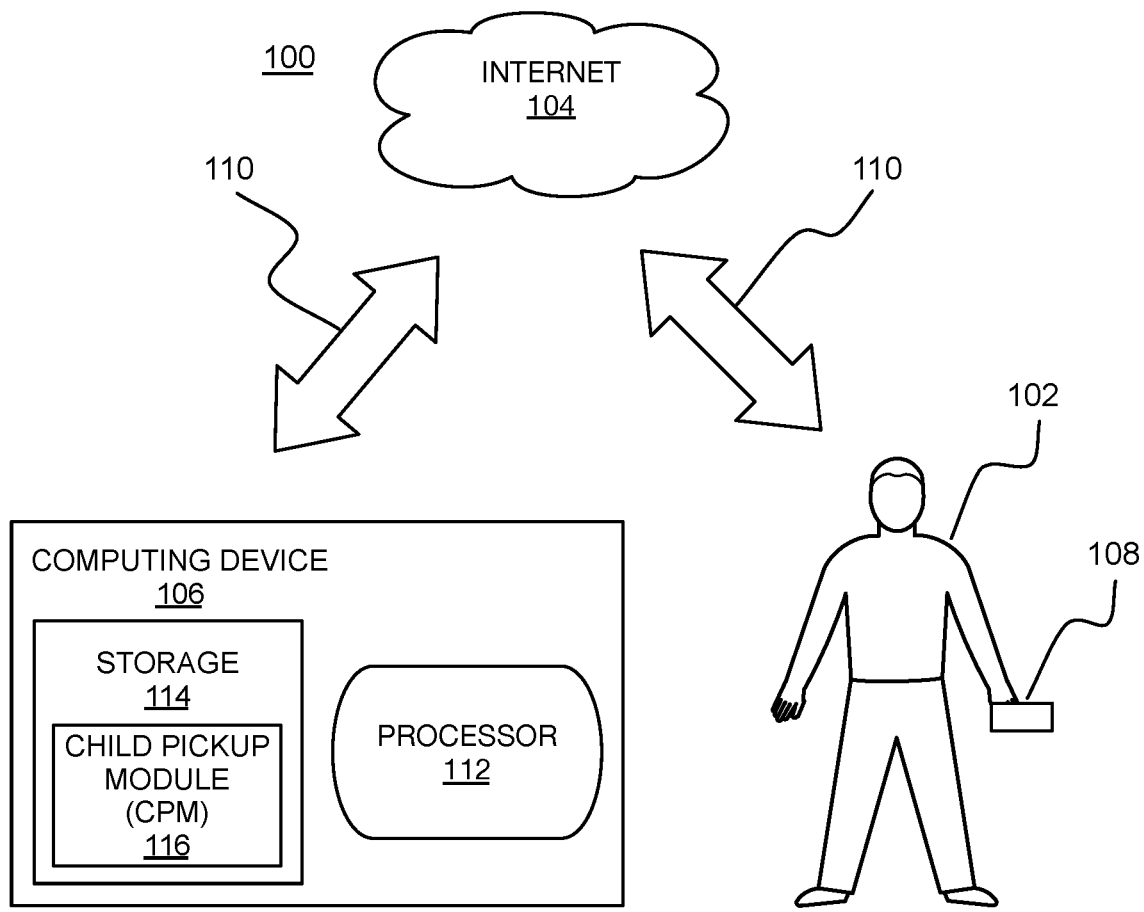
FIG. 1 illustrates a system for machine coordination and management of uniting a minor with a guardian at a location, in accordance with various embodiments.

The following description sets forth various examples along with specific details to provide a thorough understanding of claimed subject matter. It will be understood by those skilled in the art after review and understanding of the present disclosure, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to apparatus and systems related to machine coordination and management of uniting a minor with a guardian at a location.

A common activity that a parent or guardian may engage in during a day may be to drop off a minor (e.g., a child) at an institution (e.g., a school) by a prescribed time, and the end of the day, pick up the minor from the institution at another prescribed time. Numerous variables may affect this activity such as, but not limited to, number of minors, distance to the institution, method of transportation, weather, traffic, schedule of the guardian, changes in the guardian picking up the minor, and so forth. The numerous variables may make coordination of this activity complex and difficult, which may cause at least stress on the guardian.

Between the activity of dropping off the minor and picking up the minor, picking up the minor may include added complexity and difficulty. The added complexity and difficulty may arise from ensuring that the minor is picked up substantially on time and that the guardian picking up the minor is the appropriate person. This added complexity and difficulty may be a factor to consider from both sides (i.e., the guardian and the institution) because ensuring that the minor is picked up by the appropriate person is related to safety for the minor. As may be appreciated, the variables adding to the complexity and difficulty of this type of activity may make it difficult to coordinate and manage the activity, which may cause stress for the guardian and potentially for the minor.

In the present disclosure, it should be appreciated that "minor" as used herein may include a variety of people who may require some form of guardianship such as, but not limited to, a child, a disabled person (e.g., mentally or physically), emotionally challenged person, and so forth. Accordingly, the claimed subject matter is not limited in this respect. Additionally, a "guardian" may be any person who may be responsible for welfare of a reliant person such as, but not limited to, a minor as used herein. Accordingly, the claimed subject matter is not limited in this respect.

Before to turning the figures, a non-limiting example scenario utilizing the various embodiments of the present disclosure may be described. In the non-limiting scenario, a guardian (e.g., a parent) may be responsible for a minor (e.g., a child). The parent/child relationship may be of a common type (e.g., the parent being responsible for the welfare of the child). In this example, a daily routine of the parent may be to drop off the child at an institution (e.g., a school). The parent may use a vehicle such as, but not limited to, an automobile or car. Additionally, the parent may have a mobile device such as, but not limited to, a smartphone.

Continuing with the non-limiting scenario, a typical day may include the parent and child leaving their place of residence (e.g., a home) in the car for school. Since classes may begin at some predetermined time (e.g., 8:30 a.m.), the parent may try to arrive at the school by 8:30 a.m. After dropping off the child at the school, the parent may drive to their place of employment (e.g., work). At the end of the school day (e.g., 3:00 p.m.), the parent may depart from work and pick up the child from school.

In this non-limiting scenario, the child has been dropped off at the school in the morning, the location of the work is approximately 10 miles from school, and the parent is at work. In the afternoon (e.g., 2:00 p.m.), the parent decides to depart from work and drive to the school to pick up the child. The parent may transmit an indication that the parent is about to be en route to the school. The indication may be transmitted via an application on the smartphone of the parent (e.g., app). The indication may be received by a child pickup module (CPM). The CPM may recognize the smartphone as being a registered device (e.g., registered via the app). The registration may facilitate confirmation that the smartphone is owned by the parent.

Responsive to receiving the indication that the parent is about to be en route, the CPM may transmit to the smartphone a request for confirmation of a user of the registered device. The request for confirmation may be provided to the parent via the app or some other form of communication (e.g., text message, email, etc.). The request may include a request for an image of the user of the smartphone (e.g., a selfie of the parent). The selfie may be captured via the app or via a camera function on the smartphone. In this non-limiting scenario, the parent may take a selfie and transmit the selfie via the app. The CPM may receive the image and determine if the requested confirmation of the user is received (i.e., the selfie). If the selfie is received, the CPM may confirm that the selfie is the parent or guardian of the child. The confirmation may be performed by facial recognition methodologies by the CPM such as, but not limited to, facial matching of stored images. Additionally, the CPM may confirm that the selfie was taken proximate to the time of the received indication and the request for confirmation (e.g., metadata including date, time, location, etc.).

Once the registered device and the parent have been confirmed, the CPM may determine a location of the smartphone (i.e., the parent). The location may be determined utilizing global positioning system (GPS) related methodologies. For example, responsive to a request for location information from the CPM, a GPS device included in the smartphone may transmit its location to the CPM. Accordingly, when the parent begins to travel with the smartphone, the CPM may detect this motion. The CPM may determine an estimated time of arrival (ETA) for the parent based, at least in part, on the travel speed, traffic conditions, etc., where the CPM may utilize a third party software such as, but not limited to, Google Maps web mapping platform available from Google LLC of Mountain View, Calif. The ETA may be periodically updated based, at least in part, on changes in the travel conditions (e.g., traffic conditions, travel speed, etc.).

As the smartphone (i.e., parent) gets close to the school, the CPM may receive an indication of a close proximity of the parent to the school. The indication of the close proximity may be based, at least in part, on a predetermined virtual perimeter (e.g., geofence) around the school. Once the parent is close to the school, the CPM may coordinate the picking up of the child by the parent by collocating the child and the parent at the school. For example, a school personnel may take the child to a pickup location as timed and indicated by the CPM ensuring the school personnel releases custody of the child to an authorized person (i.e., parent or guardian).

Once the parent and child are united, a confirmation of the pickup may be received from the smartphone by the CPM. For example, the child may have a radio-frequency identification (RFID) device such as, but not limited to, a bracelet, a necklace, a button, and so forth. The RFID device may be configured to communicate with the smartphone, and the smartphone may communicate an indication of the detection and communication with the RFID device to the CPM. As a result, in addition to the coordination of the picking up of the child, the CPM may facilitate confirmation of the pickup.

In the above non-limiting scenario, if one or more of the confirmation requests are not met, the CPM may be configured to prevent the child from being picked up (e.g., inform the school personnel that one or more confirmations were not received). Additionally, the CPM may be configured to inform authorities (e.g., school personnel, law enforcement, Amber Alert, etc.) for some situations, where the welfare of the child may be in question.

In another non-limiting scenario, the child has been dropped off at the school in the morning, the location of the work is approximately 10 miles from school, and the parent is at work. In the afternoon (e.g., 2:00 p.m.), the parent decides to depart from work and drive to the school to pick up the child. However, the parent may not be able to leave work. Accordingly, the parent may ask another person (e.g., grandparent) to pick the child up. The grandparent may have a smartphone as well, but the grandparent's smart phone may not have been registered with the CPM. In this example, the parent may transmit temporary credentials to the grandparent's smartphone via one or more communication methodologies such as, but not limited to, via the app as described above, text, email, and so forth. The grandparent may install the app on their smartphone and incorporate the temporary credentials.

Using the app, the grandparent may transmit an indication from their smartphone to the CPM, including the temporary credentials, that the grandparent is about to be en route to the school to pick up the child. Upon receipt of the temporary credentials, the CPM may determine the identity of the child to be picked up. The CPM may transmit a request for confirmation of a user of the device, the device from which the indication having the temporary credentials were received. If and when the CPM receives the confirmation from the grandparent, the CPM may transmit the confirmation of the user of the device received (e.g., selfie) to the parent (i.e., registered device that provided the temporary credential to the grandparent's device). The parent may transmit a confirmation to the CPM that the confirmation of the user of the device (i.e., the grandparent) is the grandparent and is confirmed.

Once the device having the temporary credentials and the grandparent have been confirmed, the CPM may determine a location of the grandparent's smartphone (i.e., the grandparent). The CPM may proceed to coordinate and manage the grandparent picking up the child as previously described including confirmation of the child being picked by the grandparent. As a result, machine coordination and management of uniting a minor with a guardian at a location may be facilitated.

Turning now to FIG. 1, FIG. 1 illustrates a system for machine coordination and management of uniting a minor with a guardian at a location, in accordance with various embodiments. In FIG. 1, a system 100 may include a user 102, the Internet 104, and a computing device 106. The user 102 may have a mobile device 108, where the mobile device may be communicatively coupled to the Internet 104 via a communication medium 110. As shown, the computing device 106 be illustrated as a block diagram and may be communicatively coupled to the Internet 104 via the communication medium 110. The computing device 106 may include a processor 112 and a storage medium 114. Additionally, the processor may include a child pickup module (CPM 116). In FIG. 1, the CPM 116 may comprise of instructions that, when executed by the processor 112, may operatively enable coordination and management of uniting the person 102 with the person 102 with a minor, in accordance with various embodiments.

In FIG. 1, the user 102 may use their mobile device 108 to communicate an indication that the user 102 is about to be en route to a predetermined location (e.g., school) to the computing device 106. In one example, the mobile device 108 may be a registered device, where the user 102 may have previously registered the mobile device 108 with the computing device 106. The information related to the registration may be stored in the storage medium 114.

As shown in FIG. 1, the indication may be communicated to the computing device 106 via the Internet 104 utilizing the communication medium 110. The computing device 106 utilizing the CPM 116 may receive the indication from the mobile device 108. The computing device 106 may transmit a request for confirmation of the user 102 of the mobile device 108. The requested confirmation may be in some form of identification being substantially contemporaneous with the received indication (i.e., substantially similar in time).

In one example, the user 102 may take a selfie utilizing the mobile device 108 and may transmit the selfie to the computing device 106. The computing device 106 may determine if the requested confirmation of the user of the registered device is received. In the one example, the confirmation may be the selfie (i.e., an image of the user 102). The selfie of the user may be compared to a stored image of the user 102. The stored image of the user 102 may have been stored with the information related to the registration. The computing device 106 may utilize various facial recognition methodologies to confirm the stored image with the received selfie. Additionally, the selfie may have been received with metadata (e.g., date, time, and/or location), which may substantially correspond to the time the selfie was taken (e.g., the user 102 took the selfie, and the image is not a photo taken at a different time). The substantial contemporaneous of the selfie and the indication may help facilitate security for the minor because the person picking up the child would be an authorized person.

If the computing device 106 receives the confirmation, the computing device 106 may determine the location of the mobile device 108. The location of the person 102 may be determined by receiving GPS information from the mobile device 108. The person 102 begin to be en route the predetermined location (e.g., school).

In FIG. 1, the mobile device may be a variety of mobile devices such as, but not limited to, a smartphone, a tablet, a laptop personal computer, and so forth. The communication medium may include wired, and/or wireless communication mediums such as, but not limited to, Ethernet, WiFi, Bluetooth, and so forth. The Internet 104 may be a variety of networks such as, but not limited to, wide area network (WAN), local area network (LAN), and so forth. The computing device 106 may be wide variety of computing devices such as, but not limited to, computing devices configured for artificial intelligence (AI)/machine learning (e.g., AI processors available from Intel Corporation of Santa Clara, Calif. (e.g., Nervana™ type processors), available from Nvidia Corporation of Santa Clara, Calif. (e.g., Volta™ type processors), available from Apple Company of Cupertino, Calif. (e.g., A11 Bionic™ type processors), available from Huawei Technologies Company of Shenzen, Guangdong, China (e.g., Kirin™ type processors), available from Advanced Micro Devices, Inc. of Sunnyvale, Calif. (e.g., Radeon Instinct™ type processors), available from Samsung of Seoul, South Korea (e.g., Exynos™ type processors), as part of an on-demand computing system resources (e.g., cloud computing), and so forth. Accordingly, the claimed subject matter is not limited in these respects.

Figure 2:
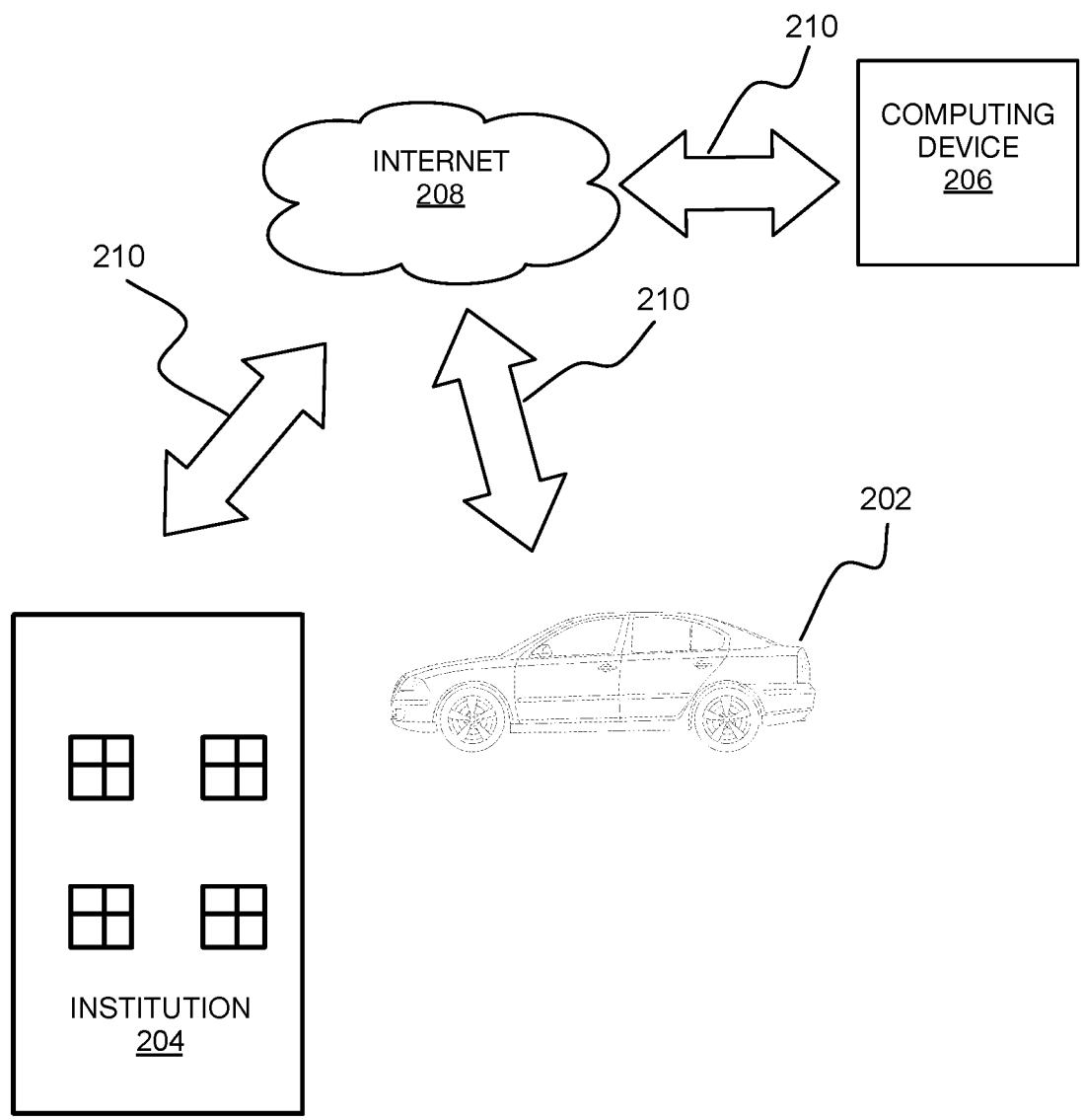
FIG. 2 illustrates coordination and management of a guardian during travel to an institution, in accordance with various embodiments.

Turning now to FIG. 2, FIG. 2 illustrates coordination and management of a guardian during travel to an institution, in accordance with various embodiments. In FIG. 2, the user 102 (shown in FIG. 1) may be using a vehicle 202 to travel to an institution 204. In FIG. 2, the user 102 may have their mobile device 108 (shown in FIG. 1) with them inside the vehicle 202. As shown in FIG. 2, the mobile device 108 may be in communication with a computing device 206 via the Internet 208 utilizing a communication medium 210. Additionally, the institution 204 may be in communication with the computing device 206 to help facilitate the coordination (e.g., a computing device located at the institution).

Having determined the location of the mobile device 108 (i.e., the vehicle 202 having the mobile device 108), the computing device 206 may determine an estimated time of arrival (ETA) of the vehicle at the institution 204. As the vehicle 202 travels to the institution 204, the ETA may be periodically or continually updated to reflect the movement of the vehicle 202. The computing device 206 may utilize a variety of mapping methodologies such as, but not limited to, Google Maps, Apple Maps available from Apple Inc. of Cupertino, Calif., and so forth. The computing device 206 may communicate the ETA to the vehicle 202 and/or to the institution 204 further facilitating the coordination.

The institution 204 may have a predetermined virtual perimeter (e.g., geofence) around the institution 204, which may be monitored by the computing device 206. When the vehicle 202 comes in proximity to the virtual perimeter around the institution 204, the computing device 206 may communicate the close proximity to the institution 204 and/or to the vehicle 202. In one example, the computing device 206 may communicate to a mobile device of an institution personnel the proximity of the vehicle 202. In another example, the computing device 206 may communicate the proximity to the vehicle 202.

The computing device 206 may coordinate that the institution personnel and the vehicle arrive at a location approximately similar times (e.g., within 5 to 10 minutes of each other). In one example, the computing device 206 may determine an estimate for how long the institution personnel may take to travel to a predetermined location at the institution 204 and/or institution property (e.g., time it may take for the institution personnel to walk to the predetermined location). The computing device 206 may estimate the time of the personnel to walk based, at least in part, on the layout of the institution 204 (e.g., length of hallways, stairs, etc.) and/or the location of the mobile device of the institution personnel.

In FIG. 2, the user may be shown traveling in the vehicle 202. However, the user may travel utilizing a wide variety of methods such as, but not limited to, public transportation (e.g., bus, subway, taxi, train, etc.) and/or various other forms of movement such as, but not limited to, walking, running, bicycling, etc. Accordingly, the claimed subject matter is not limited in these respects.

Additionally, in some examples, the vehicle 202 may include software for working with the mobile device 108 of the user 102. For example, the vehicle may have software configured to pair with the mobile device 108, where the vehicle software may facilitate communication with the computing device 206 and/or the mobile device 108.

Figure 3:
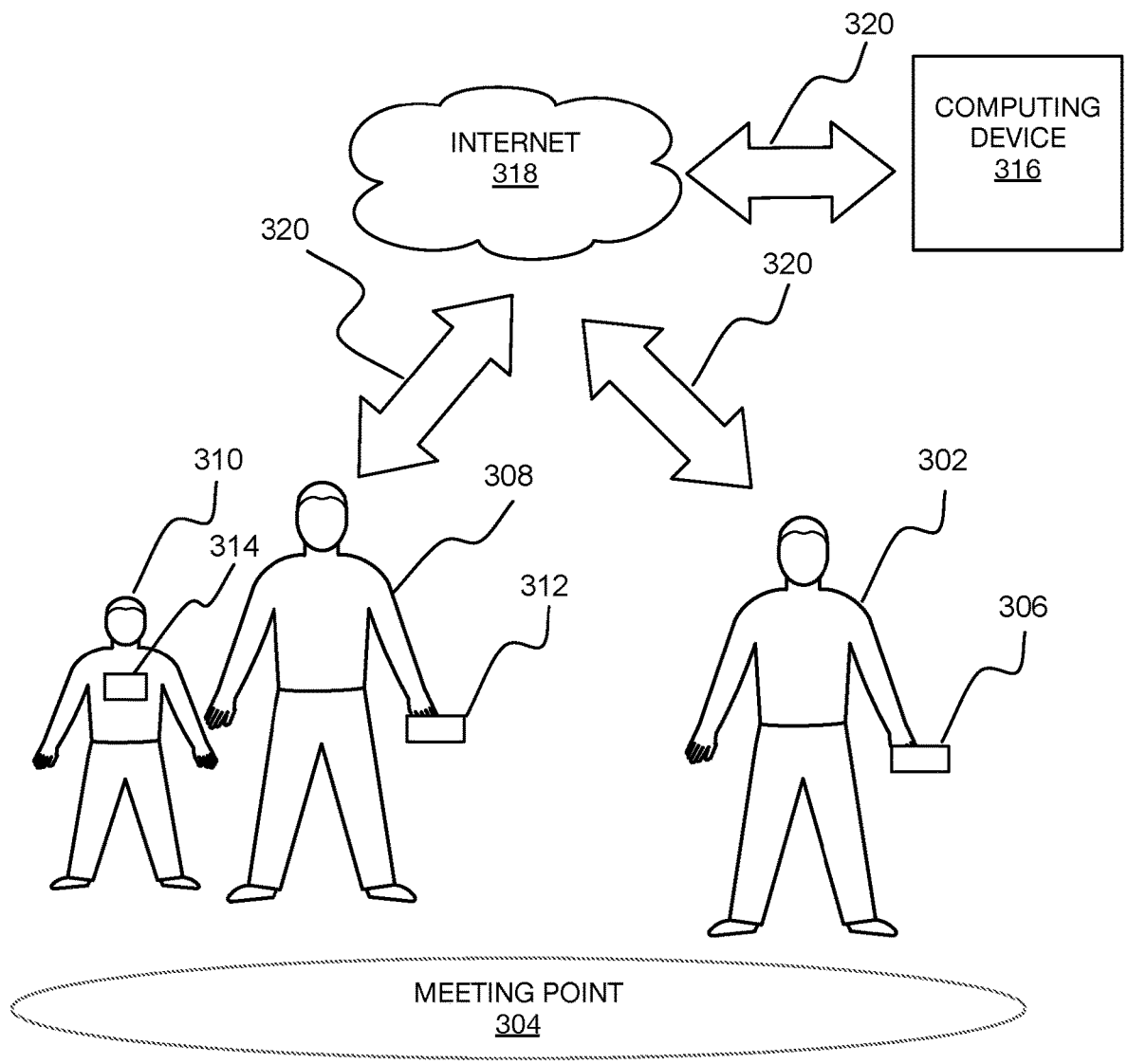
FIG. 3 illustrates uniting of a guardian with a minor, in accordance various embodiments.

FIG. 3 illustrates uniting of a guardian with a minor, in accordance various embodiments. In FIG. 3, a user 302 may have arrived at a predetermined location (e.g., meeting point 304) of the institution 204 (shown in FIG. 2) guided by a mobile device 306. Additionally, an institution personnel 308 may have arrived at the meeting point 304 close in time with the user 302. In FIG. 3, the institution personnel 308 may have guided a subject (minor 310) to the meeting point 304 as well. The institution personnel 308 may have a mobile device for use at the institution (institution device 312). The minor 310 may have a subject device (minor device 314). The mobile device 306 may be communicatively coupled to a computing device 316 via the Internet 318 utilizing a communication medium 320).

In the example of FIG. 3, the computing device 316 may have coordinated the colocation of the institution personnel 308 with the user 302 at the meeting point 304. In one example, the institution personnel 308 may have brought the minor 310 to the meeting point 304, where the institution personnel 308 may release the minor 310 to the user 302. Once united, a confirmation of the minor 310 being with the user 302 may be facilitated by the minor device 314, which may be an RFID device. The minor device 314 may communicate with the mobile device 306, and this communication may be relayed to the computing device 316 confirming the uniting of the minor 310 with the user 302.

Figure 4:
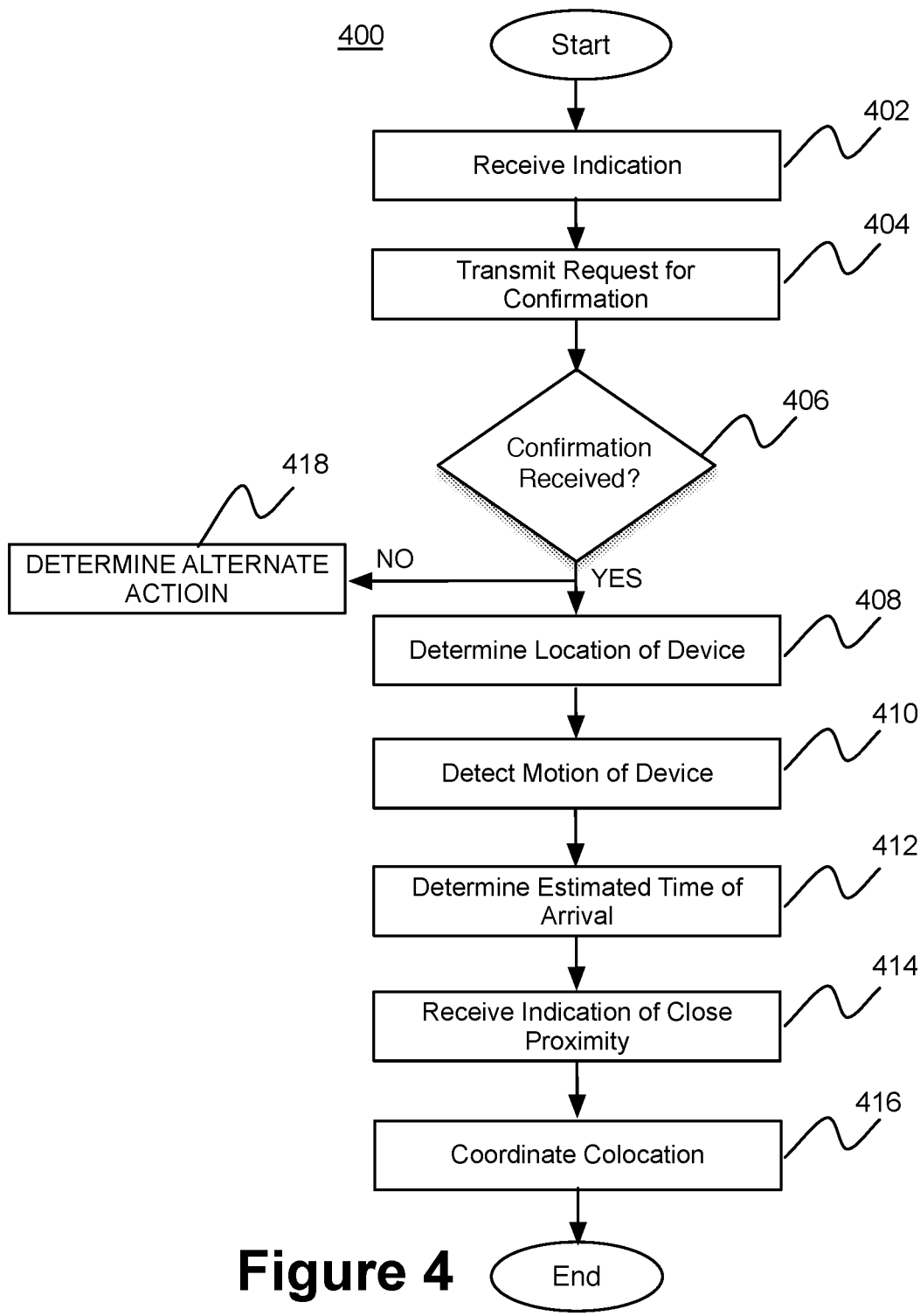
FIG. 4 illustrates an operational flow for coordinating and managing of uniting a minor with a guardian at a location, in accordance with at least some of the embodiments described herein.

In another example, the minor device 314 may be a mobile device such as, but not limited to, a smartphone. In this example, the computing device 316 may guide the minor 310 directly without the institution personnel 308. The minor 310 may have made their way to the meeting point 304 utilizing the guidance provided by the computing device 316 because the computing device 316 may determine the location of the minor device 314 within the institution or its grounds and guide the minor 310 to the meeting point 304. The guidance may include consideration of the layout of the institution and/or its grounds, as previously described. As a result, coordination and management of uniting a minor with a guardian at a location may be facilitated, in accordance with various embodiments FIG. 4 illustrates an operational flow for coordinating and managing of uniting a minor with a guardian at a location, in accordance with at least some of the embodiments described herein. In some portions of the description, illustrative implementations of the method are described with reference to the system 100 depicted in FIG. 1. However, the described embodiments are not limited to these depictions.

More specifically, some elements depicted in FIG. 1 may be omitted from some implementations of the methods detailed herein. Furthermore, other elements not depicted in FIG. 1 may be used to implement example methods detailed herein.

Additionally, FIG. 4 employs block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of claimed subject matter.

In some examples, operational flow 400 may be employed as part of coordination and management of uniting a minor with a guardian at a location. Beginning at block 402 ("Receive Indication"), the CPM 116 may receive an indication from a registered device that the registered device is about to be en route to a predetermined location, the predetermined location having a subject. In one example, the subject may be a minor, and the predetermined location may be a predetermined location at a school.

Continuing from block 402 to 404 ("Transmit Request for Confirmation"), the CPM 116 may transmit a request for confirmation of a user of the registered device.

Continuing from block 404 to decision block 406 ("Confirmation Received?"), as part of the coordination protocol, the CPM 116 may determine if the requested confirmation of the user of the registered device is received.

Continuing from block 406 to 408 ("Determine Location of Device"), if it is determined that the requested confirmation of the user of the registered device is received, determine a location of the registered device under the control of the CPM 116.

Continuing from block 408 to 410 ("Detect Motion"), under the control of the CPM 116, detect motion of the registered device. As the registered device starts en route to the predetermined location.

Continuing from block 410 to 412 ("Determine Estimated Time of Arrival"), the CPM 116 may determine, an estimated time of arrival (ETA) at the predetermined location based, at least in part, on the detected motion of the registered device. In some examples, the CPM 116 may determine the ETA by utilizing various mapping software such, as but not limited to, Google Maps.

Continuing from block 412 to 414 ("Receive Indication of Close Proximity"), the CPM 116 may receive an indication of close proximity of the registered device to the predetermined location. In one example, the predetermined location may have geofencing.

Continuing from block 414 to 416 ("Coordinate Colocation"), the CPM 116 may coordinate colocation of the registered device and the subject at the predetermined location. In some examples, the colocation may be a meeting point determined by the CPM 116. The CPM 116 may coordinate to have the minor and guardian arrive at the meeting point approximately at the same or close to same time.

If at decision block 406, if it is determined if the requested confirmation of the user of the registered device is not received, the operation may continue from decision block to 406 to operational block 418 ("Determine Alternate Action"). In one example, the CPM 116 may determine to contact an institute personnel. In another example, the CPM 116 may contact law enforcement as previously described.

In general, the operational flow described with respect to FIG. 4 and elsewhere herein may be implemented as a computer program product, executable on any suitable computing system, or the like. For example, a computer program product for coordinating a number of drones may be provided. Example computer program products are described with respect to FIG. 5 and elsewhere herein.

FIG. 5 illustrates an example computer program product 500, arranged in accordance with at least some embodiments described herein. Computer program product 500 may include machine readable non-transitory medium having stored therein instructions that, when executed, cause the machine to coordinate and manage uniting of a minor with a guardian at a location according to the processes and methods discussed herein. Computer program product 500 may include a signal bearing medium 502. Signal bearing medium 502 may include one or more machine-readable instructions 504, which, when executed by one or more processors, may operatively enable a computing device to provide the functionality described herein. In various examples, some or all of the machine-readable instructions may be used by the devices discussed herein.

In some examples, the machine readable instructions 504 may operatively enable a child pickup module (CPM) to receive an indication from a registered device that the registered device is about to be en route to a predetermined location, the predetermined location having a subject. The machine readable instructions 504 may transmit a request for confirmation of a user of the registered device. The machine readable instructions 504 may determine if the requested confirmation of the user of the registered device is received. If it is determined that the requested confirmation of the user of the registered device is received, the machine readable instructions 504 may determine a location of the registered device. The machine readable instructions 504 may detect motion of the registered device. The machine readable instructions 504 may determine an estimated time of arrival at the predetermined location based, at least in part, on the detected motion of the registered device. The machine readable instructions 504 may receive an indication of close proximity of the registered device to the predetermined location. Responsive to the received indication of close proximity, the machine readable instructions 504 may coordinate colocation of the registered device and the subject at the predetermined location.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, the signal bearing medium 502 may encompass a recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communication link, a wireless communication link, etc.). In some examples, the signal bearing medium 502 may encompass a machine readable non-transitory medium.

In general, the methods described with respect to FIG. 4 and elsewhere herein may be implemented in any suitable computing system and/or interactive electronic system. Example systems may be described with respect to FIG. 6 and elsewhere herein. In general, the system may be configured to coordinate a number of drones for a task/service to be performed.

Figure 6:
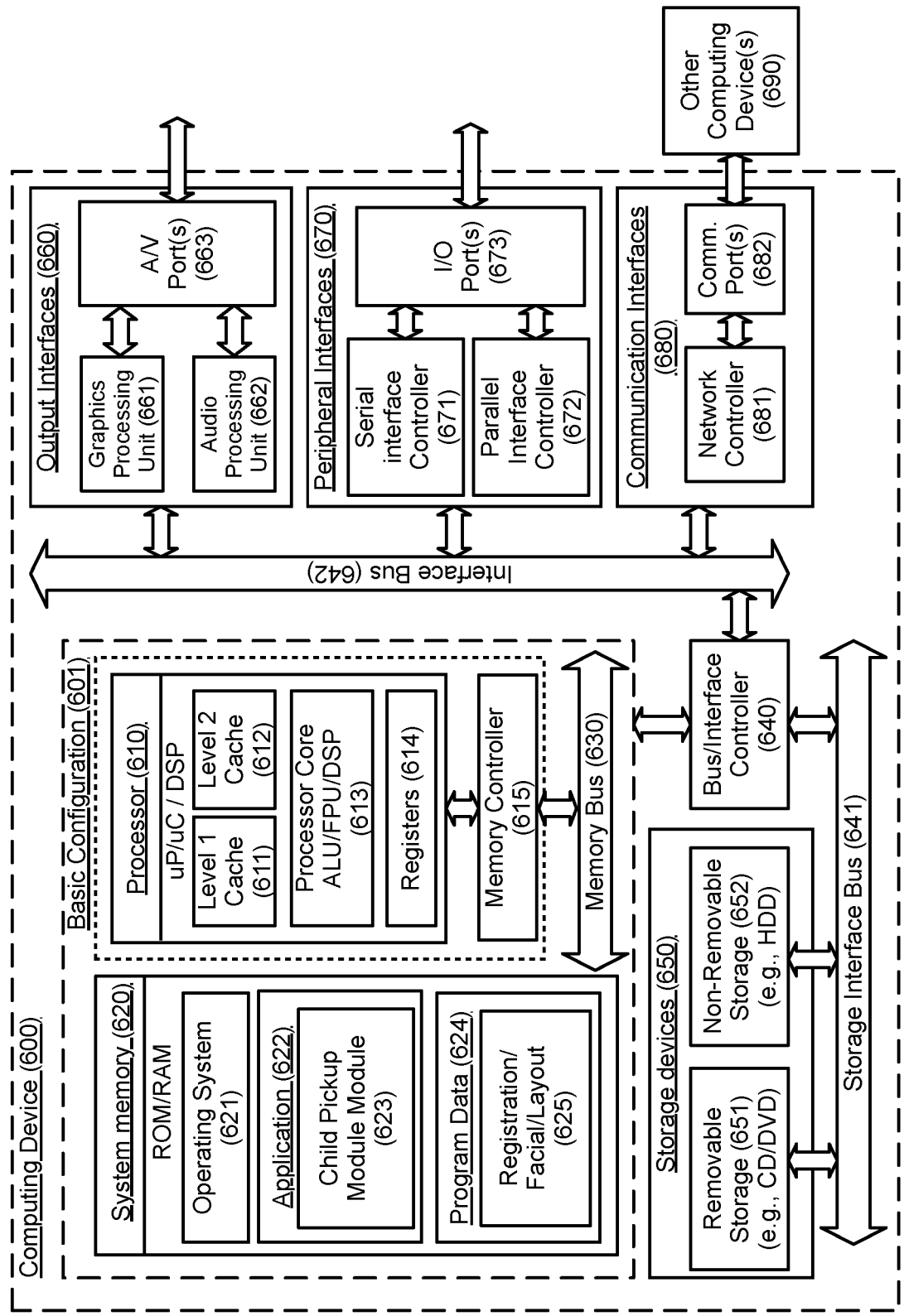
FIG. 6 is a block diagram illustrating an example computing device, arranged in accordance with at least some embodiments described herein.

FIG. 6 is a block diagram illustrating an example computing device 600, arranged in accordance with at least some embodiments described herein. In various examples, computing device 600 may be configured to coordinate and manage uniting of a minor with a guardian at a location as discussed herein. In one example of a basic configuration 601, computing device 600 may include one or more processors 610 and a system memory 620. A memory bus 630 can be used for communicating between the one or more processors 610 and the system memory 620.

Depending on the desired configuration, the one or more processors 610 may be of any type including but not limited to a microprocessor (μP), a microcontroller (μC), a digital signal processor (DSP), or any combination thereof. Additionally, the microprocessors may include AI capable processors such as those previously mentioned. The one or more processors 610 may include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the one or more processors 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. The system memory 620 may include an operating system 621, one or more applications 622, and program data 624. The one or more applications 622 may include child pickup module (CPM) 623 that can be arranged to perform the functions, actions, and/or operations as described herein including the functional blocks, actions, and/or operations described herein. The program data 624 may include Registration/Facial/Layout 625 for use with the CPM application 623. In some example embodiments, the one or more applications 622 may be arranged to operate with the program data 624 on the operating system 621. This described basic configuration 601 is illustrated in FIG. 6 by those components within dashed line.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The one or more data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 620, the removable storage 651 and the non-removable storage 652 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 683 over a network communication via one or more communication ports 682. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 600 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 600 may also be implemented as a personal computer including both laptop computer and non-laptop computer configurations. In addition, the computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type of medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter may not be limited to the particular examples disclosed, but that such claimed subject matter also may include all implementations falling within the scope of the appended claims, and equivalents thereof.

What is claimed:

1. A method comprising:
receiving, at a computing device, an indication from a registered device that the registered device is about to be en route to a predetermined location, the predetermined location having a subject;
transmitting, by the computing device, a request for confirmation of a user of the registered device;
determining, by the computing device, if the requested confirmation of the user of the registered device is received;
if it is determined, by the computing device, that the requested confirmation of the user of the registered device is received, determining a location of the registered device;
detecting, by the computing device, motion of the registered device;
determining, by the computing device, an estimated time of arrival of the registered device at the predetermined location based, at least in part, on the detected motion of the registered device;
receiving, by the computing device, an indication of close proximity of the registered device to the predetermined location; and
coordinating, by the computing device, colocation of the registered device and the subject at the predetermined location, wherein the coordinating includes a guided movement of the subject to the predetermined location and determining an estimated time of arrival for both the registered device and the subject at the predetermined location based, at least in part, on the detected motion of the registered device and the guided movement of the subject.

2. The method of claim 1 further comprising receiving, by the computing device, an indication of a confirmation of colocation of the registered device and the subject at the predetermined location.

3. The method of claim 2, wherein the confirmation comprises receiving an indication of activation of a radio-frequency identification (RFID) device on the subject.

4. The method of claim 1, wherein receiving the indication from the registered device comprises receiving the indication from a smart phone.

5. The method of claim 1, wherein the predetermined location comprises a school.

6. The method of claim 1, wherein the subject comprises a minor child.

7. The method of claim 1, wherein transmitting the request for confirmation comprises a request for an image of the user.

8. The method of claim 7, wherein the request for the image comprises the image of the user having metadata of a date and time of the image of the user.

9. The method of claim 1, wherein determining if the request confirmation of the user of the registered device is received comprises matching received confirmation information with a stored confirmation information.

10. The method of claim 9, wherein matching comprises determining if a received image of the user substantially matches a stored image of the user.

11. The method of claim 1, wherein determining if the requested confirmation of the user of the registered device is received comprises determining if a metadata of a received confirmation substantially corresponds to a transmission information of the received confirmation.

12. The method of claim 1, wherein determining the location of the registered device comprises transmitting a request to the registered device global positioning system (GPS) information corresponding to the location of the registered device.

13. The method of claim 1, wherein the determining the estimated time of arrival at the predetermined location comprises periodically requesting the registered device global positioning system (GPS) information corresponding to the location of the registered device.

14. A system comprising:
a processor;
a storage medium communicatively coupled to the processor; and
a child pickup module (CPM) communicatively coupled to the processor, the CPM configured to:
receive an indication from a registered device that the registered device is about to be en route to a predetermined location, the predetermined location having a subject, transmit a request for confirmation of a user of the registered device, determine if the requested confirmation of the user of the registered device is received, if it is determined that the requested confirmation of the user of the registered device is received, determine a location of the registered device, detect motion of the registered device, determine an estimated time of arrival of the registered device at the predetermined location based, at least in part, on the detected motion of the registered device, receive an indication of close proximity of the registered device to the predetermined location, and responsive to the received indication of close proximity, coordinate colocation of the registered device and the subject at the predetermined location, wherein coordinate colocation includes a guided movement of the subject to the predetermined location and determine an estimated time of arrival for both the registered device and the subject at the predetermined location based, at least in part, on the detected motion of the registered device and the guided movement of the subject.

* * * * *